(12) United States Patent
Treanton

(10) Patent No.: US 9,039,252 B2
(45) Date of Patent: May 26, 2015

(54) LENS FOR ASYMMETRICAL LIGHT BEAM GENERATION

(75) Inventor: Vincent Treanton, Lyons (FR)

(73) Assignee: Koninklijkle Philips N.V., Eindhoven (NL)

( * ) Notice: Subject to any disclaimer, the term of this patent is extended or adjusted under 35 U.S.C. 154(b) by 218 days.

(21) Appl. No.: 13/500,101

(22) PCT Filed: Sep. 29, 2010

(86) PCT No.: PCT/IB2010/054385
§ 371 (c)(1),
(2), (4) Date: Apr. 4, 2012

(87) PCT Pub. No.: WO2011/042837
PCT Pub. Date: Apr. 14, 2011

(65) Prior Publication Data
US 2012/0195040 A1   Aug. 2, 2012

(30) Foreign Application Priority Data

Oct. 8, 2009   (EP) ..................................... 09305953

(51) Int. Cl.
| | |
|---|---|
| *F21V 5/04* | (2006.01) |
| *F21V 5/00* | (2006.01) |
| *F21S 8/08* | (2006.01) |
| *F21V 5/08* | (2006.01) |
| *G02B 19/00* | (2006.01) |
| *F21W 131/103* | (2006.01) |
| *F21Y 101/02* | (2006.01) |

(52) U.S. Cl.
CPC . *F21S 8/086* (2013.01); *F21V 5/04* (2013.01); *F21V 5/08* (2013.01); *G02B 19/0028* (2013.01); *G02B 19/0061* (2013.01); *F21W 2131/103* (2013.01); *F21Y 2101/02* (2013.01)

(58) Field of Classification Search
USPC ........................ 362/332–340, 311.02, 311.06
See application file for complete search history.

(56) References Cited

U.S. PATENT DOCUMENTS

| | | | |
|---|---|---|---|
| 3,711,722 A | 1/1973 | Kavanagh | |
| 5,924,788 A | 7/1999 | Parkyn, Jr. | |
| 7,182,497 B2* | 2/2007 | Lee et al. ...................... | 362/555 |
| 7,631,997 B2* | 12/2009 | Ishida et al. .................. | 362/520 |
| 2004/0037076 A1 | 2/2004 | Katoh | |
| 2006/0034097 A1 | 2/2006 | Hahm et al. | |
| 2006/0072313 A1* | 4/2006 | Magarill ....................... | 362/227 |
| 2006/0138437 A1 | 6/2006 | Huang et al. | |
| 2006/0186431 A1* | 8/2006 | Miki et al. .................... | 257/100 |
| 2007/0201225 A1* | 8/2007 | Holder et al. ................. | 362/227 |

(Continued)

FOREIGN PATENT DOCUMENTS

| | | |
|---|---|---|
| EP | 1621918 A1 | 2/2006 |
| EP | 2045515 A1 | 4/2009 |

(Continued)

*Primary Examiner* — Sikha Roy
(74) *Attorney, Agent, or Firm* — Meenakshy Chakravorty

(57) ABSTRACT

The invention relates to an optical device for imparting an asymmetrical light beam. The optical device comprises a lens (10) having an exit diopter (12) having an exit surface consisting of a convex surface (16) defining a curved rear portion (18) having a first curvature and a curved front portion (19) having a second curvature different from the first curvature. Furthermore the lens (10) comprises an entry diopter (11) including at least one concave lodging (13) for lodging at least one light source, the surface of the concave lodging (13) facing at least partly the curved rear portion (18).

15 Claims, 4 Drawing Sheets

(56) References Cited

U.S. PATENT DOCUMENTS

| | | | |
|---|---|---|---|
| 2007/0201255 A1 | 8/2007 | Campbell et al. | |
| 2007/0258259 A1 | 11/2007 | Ishida et al. | |
| 2008/0043466 A1* | 2/2008 | Chakmakjian et al. | 362/237 |
| 2008/0239722 A1* | 10/2008 | Wilcox | 362/268 |
| 2009/0091944 A1* | 4/2009 | de Lamberterie | 362/516 |
| 2009/0290360 A1* | 11/2009 | Wilcox et al. | 362/327 |
| 2010/0118531 A1* | 5/2010 | Montagne | 362/235 |
| 2010/0226127 A1* | 9/2010 | Bigliatti et al. | 362/235 |
| 2010/0302783 A1* | 12/2010 | Shastry et al. | 362/309 |

FOREIGN PATENT DOCUMENTS

| | | |
|---|---|---|
| FR | 2760098 | 2/1997 |
| JP | 07117527 A | 5/1995 |
| JP | 10200168 A | 7/1998 |
| JP | 11337501 A | 12/1999 |
| JP | 2007208141 A | 8/2007 |
| JP | 2008226766 A | 9/2008 |
| WO | 9833007 | 7/1998 |
| WO | 2007040527 A1 | 4/2007 |
| WO | 2008122941 A1 | 10/2008 |
| WO | 2008123960 A1 | 10/2008 |

* cited by examiner

LENS FOR ASYMMETRICAL LIGHT BEAM GENERATION

FIELD OF THE INVENTION

The invention relates to an optical device for generating an asymmetrical light beam. This optical device is particularly relevant for lighting petrol station; nevertheless, this optical device can be extended to any other field of application for indoor or outdoor lighting such as road, area or decorative lighting amongst others.

BACKGROUND OF THE INVENTION

FIG. 1 depicts a schematic lateral view of a road section 1 equipped with a luminaire 1 generating an asymmetrical light beam. The luminary, or candelabra, comprises a luminary post 2 and luminary head 3.

It is known to use reflectors to create asymmetrical beams output from the outdoor luminaries. Various reflector systems have been proposed to provide an asymmetrical beam. Such reflector systems are quite bulky.

For street lighting, usual light sources are high intensity discharge lamps like sodium vapor lamps, fluorescent balloons or fluorescent tubes. However, these kinds of sources are quite bulky and they require a frequent and time-consuming maintenance. A consequence of bulkiness is that the luminary heads also are bulky, which may be a drawback under windy conditions.

Other luminaries consists in using Light Emitting Diodes (LEDs) as light sources with primary lenses shaped to obtain a determinate and fixed light effect. Such types of primary lenses are disclosed for example in WO2008/122941, EP 1 621 918, US2006/138437, WO98/33007.

Led based luminaries are more and more desirable nowadays for both indoor and outdoor applications. They present several advantages over traditional technologies, amongst them lifetime and better light control notably. This triggers the need for specialized optics that can cover the entire range of applications achieved by traditional sources.

For instance, it is known from US2007/0201225 to provide an asymmetric lens for LED with an additional prism or extended portion to redirect the light so as to generate an asymmetrical beams.

Such lens presents the drawback to have a complex shape which is hard and quite expensive to produce. Moreover, this kind of lens can not be used in various applications.

SUMMARY OF THE INVENTION

It is an object of the invention to provide a street luminary that has low production cost.

It is another object of embodiments of the invention to provide a street luminary that allows for generating an asymmetrical light beam or a symmetrical light beam.

It is another object of embodiments of the invention to provide a street luminary that generates a smooth light.

It is another object of embodiments of the invention to provide a street luminary which has an optimized quantity of light falling on the area of interest.

It is another object of embodiments of the invention to provide a street luminary with reduced wind sensitivity.

It is a further object of embodiments of the invention to provide a street luminary that seldom requires maintenance. It is also an object of embodiments of the invention to provide a street luminary that has low operating costs.

To this end, an embodiment of the invention proposes an optical device according to claim 1. Optional embodiments of this optical device are described in claims 2-14.

Other embodiments of the invention relate to luminary heads according to claim 15 or 16.

These and other aspects of the invention will be apparent from and elucidated with reference to the embodiments described hereinafter.

BRIEF DESCRIPTION OF THE DRAWINGS

The invention will now be described in more details by way of example with reference to the accompanying drawings, in which.

DETAILED DESCRIPTION OF THE INVENTION

The following definitions are adopted in this specification. The words "street", "road", "motorway" and the like shall be construed as having a similar meaning.

A diopter is an optical surface which separates two light propagation media having different refractive indices. Examples of light propagation media are, for instance, air, glass, polymethacrylate or other plastics.

A lens is a device that causes light to either converge or diverge. It is made from a piece of shaped material, such as glass, polymethacrylate or other plastics. Usually, a lens has two faces or diopters. A face, or a part thereof, may be planar (it is not curved), convex (bulging outwards from the lens) or concave (depressed into the lens).

A quadric is second-order surface. For instance, a sphere has a quadric surface.

A metasurface is the surface of a metaball.

A metaball is defined as follows. Each component $C_i$ of a metaball may be defined by a three-dimensional mathematical function $f_i(x,y,z)$ where x, y, z are the coordinates of a point in space. A thresholding value T is chosen. For each point (x,y,z) the sum $S(x,y,z)$ of the contribution of each component of the metaball is computed and is compared to the threshold value T:

$$S(x, y, z) = \sum_{i=1}^{n} f_i(x, y, z) \qquad \text{(Eq. 1)}$$

This function defines a scalar field. If $S(x,y,z)$ is lower than the threshold value T, then point (x,y,z) is inside the volume of the metaball; if $S(x,y,z)$ is equal to the threshold value T, then point (x,y,z) is on the surface of the metaball, i.e. on the metasurface. Otherwise, point (x,y,z) is outside of the metaball. In other words, the following inequality represents the volume enclosed in the metaball defined by components $C_i$:

$$\sum_{i=1}^{n} f_i(x, y, z) \leq T \quad \text{(Eq. 2)}$$

A sphere may be represented by the following equation, where $(x_o, y_o, z_o)$ are the coordinates of the center of the sphere and r is the radius of the sphere:

$$\sqrt{(x-x_o)^2+(y-y_o)^2+(z-z_o)^2}-r=0 \quad \text{(Eq. 3)}$$

Furthermore, a cylinder with a z axis may be represented by the following equation, where r is the radius of the cylinder:

$$\sqrt{(x-x_o)^2+(y-y_o)^2}-r=0 \quad \text{(Eq. 4)}$$

It is well known that S(x,y,z) may be approximated with a polynomial function, in order to accelerate computation of the metaball and the metasurface. Further developments relating to metaballs and metasurfaces may be found on the Internet.

As indicated above, embodiments of the inventions relate to an optical device for imparting an asymmetrical light beam.

Figure 1:
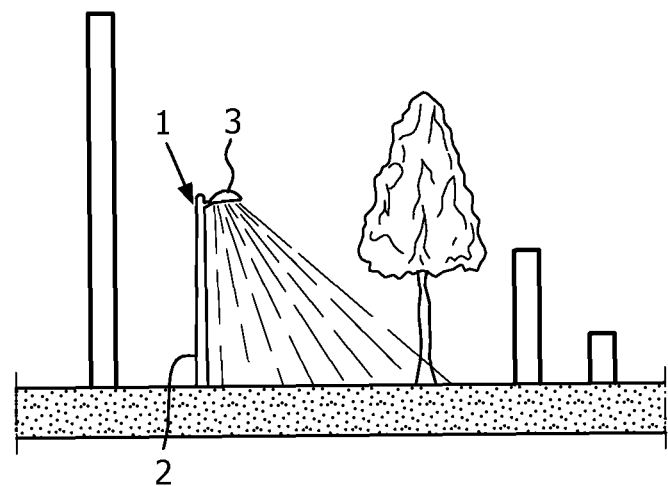
FIG. 1 shows a schematic lateral view of a road section equipped with street luminaries.
Figure 2:
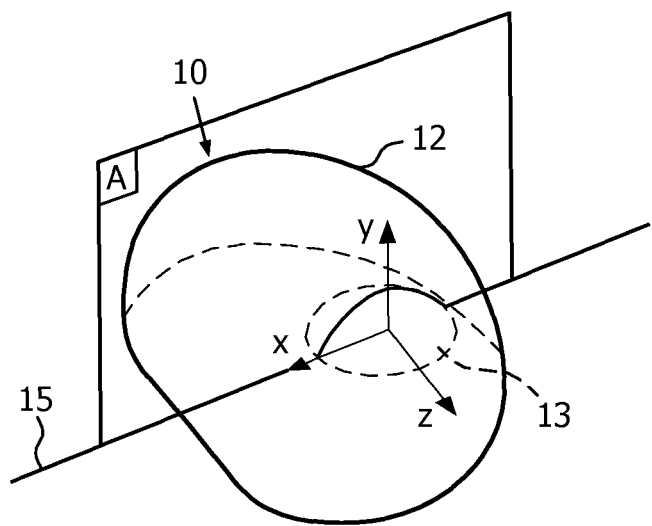
FIG. 2 shows a schematic perspective view from above of a first embodiment of an optical device according to the invention.
Figure 3:
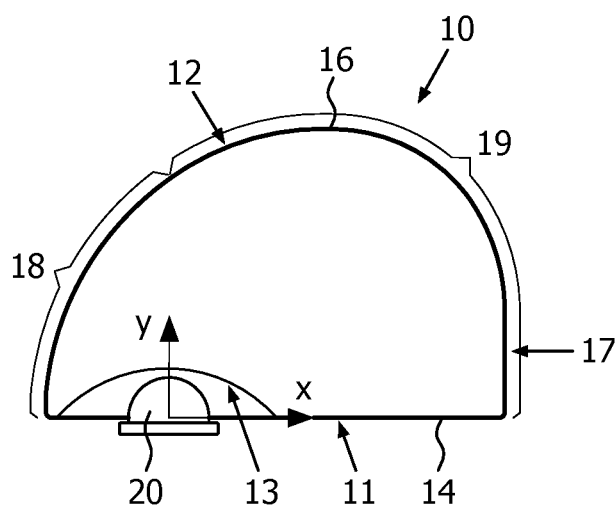
FIG. 3 shows a schematic sagittal cross-section of the first embodiment of an optical device according to the invention.
Figure 4:
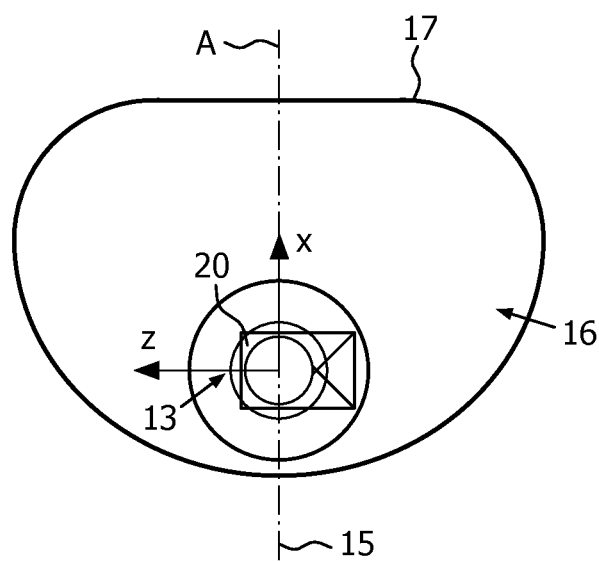
FIG. 4 shows a schematic plane view from above of the first embodiment of an optical device according to the invention.

Referring to FIGS. 2 to 4, said optical device comprises a lens 10 having an entry diopter 11 and an exit diopter 12. Preferably, the lens 10 is designed so that it is capable of shaping a round light beam into an asymmetrical light beam having a substantially homogeneous light intensity. This allows for the use of light sources such as light emitting diodes (LEDs), which usually emit round light beams. Other light sources may be appropriate. However, an advantage of LEDs is that they are miniature light sources. Thus, it becomes possible to build thin luminary heads which incorporate a plurality of LEDs, each LED being equipped with an optical device according to the invention, in order to shape a round light beam into an elongate light beam. For instance, the LEDs and their associated optical devices are arranged in a plurality of lines and rows. By imparting an appropriate bearing to the light beams, it is possible to direct the elongate light beam towards a road and light it, instead of lighting straight down under the light head. Moreover, it is possible to lodge radiators behind the LEDs (i.e. opposite the optical device with respect to the LED), between two lines of LEDs, as will be described below, with minimal impact on the thinness of the luminary head. Moreover, due to the high cost of power, the high efficiency of LEDs is beneficial.

The lens 10 has an entry diopter 11 which is concave. It may be arranged as a lodging for a light source. The general shape of the entry diopter 11 is not an essential feature of the lens 2. However it is preferred that the general shape of the entry diopter 11 be spherical, or at least quadric. Indeed, such a shape has a minimal impact on the light rays distribution. This means that, when going through such an entry diopter 11, especially a spherical diopter, the light rays distribution remains mostly unaffected.

As illustrated on FIGS. 2 and 3, each concave lodging 13 is preferably a portion of a sphere cut off by a plane at a distance comprised between 0.1*r and 0.8*r from the center of the sphere, wherein r is the radius of the sphere. In the examples depiceted by FIGS. 2-5, the cut-off plane is located at 3.4 for a radius of 4.9 (e.g. in millimeters). A base surface 14 is located at the basis of the lens 10, extending between the entry diopter 11 and the exit diopter 12. The light source should preferably be arranged with respect to the entry diopter 11, for instance in the lodging 13, so that no light goes through the base surface 14 from the light source. This may be improved by using lambertian LED, even if other types of LEDs may also be used according to the invention. This does not mean that absolutely no light passes through base surface 14, but simply that substantially all the light that is emitted by the light source is preferably directed towards the entry diopter 11. Preferably, base surface 14 is substantially inscribed in a base plane. This eases the manufacture of optical devices according to the invention, as well as the assembly of said optical devices in larger lighting devices.

Preferably, as illustrated on FIG. 2, the optical device according to the invention has at least one perpendicular plane of symmetry A, the sagittal plane of the lens 10, which is also perpendicular to the base surface 14 in which the base surface 14 is inscribed. Sagittal plane A and base surface 14 intersect on the centerline 15 of the lens 10. Preferably, the light source is located on the centerline 15 of the lens 2. Preferably said lodging 13 has an axis of symmetry which passes through said light source.

It should be noted that said lodging 13 may receive a plurality of light sources without departing from the scope of the invention. Moreover, the lens 10 may comprise a plurality of lodging 13 wherein the geometric center of lodgings 13, and also light sources, lies within the sagittal plane of the lens 10.

Most important is the shape of the exit diopter 4 of the lens 2 and the location of the light source(s). Indeed, it is mainly the shape of the exit diopter 12 that conditions the light ray distribution at the exit of the lens 10. The exit diopter 12 comprises an exit surface that presents a convex surface including a first convex section 16 and a planar face 17 which is sensibly perpendicular to the sagittal plane of the lens 10.

Preferably, the said first convex section 16 and planar face 17 define a continuous surface which is rotationally constructed around at least one rotation axis merging the centerline 15 of the lens 10, in a Cartesian orthonormal coordinate system wherein x-axis and y-axis lie within the sagittal plane of the lens and z-axis lies within the planar base surface 14.

Alternatively, the overall exit diopter 12 may comprise a rotationally symmetrical surface. This means that, at a Z-position, the radii of the corresponding surface points have the same values for any angular position: this is a symmetry of revolution around the center line 15.

Figure 5:
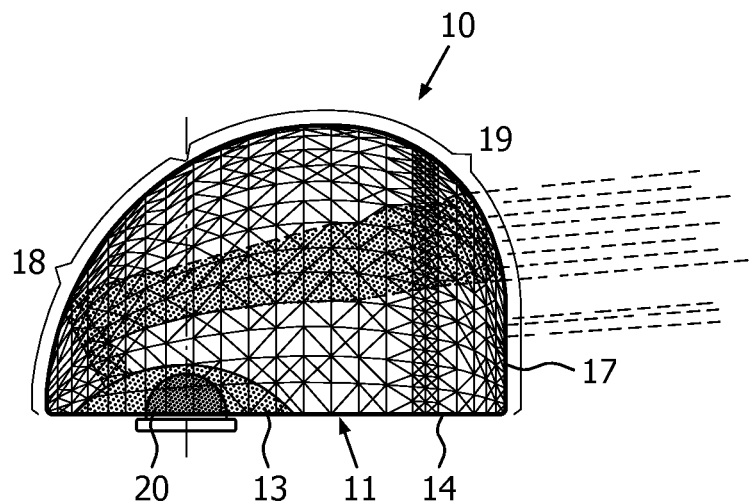
FIG. 5 shows a schematic side elevation view of the reflected light rays by the outer lens of the optical device according to the invention.

In a preferred embodiment of the invention, the exit diopter 12 comprises an exit surface consisting of a convex surface 16 defining a curved rear portion 18 having a first curvature and a curved front portion 19 having a second curvature different from the first curvature. The profile of the rear portion 18 in a plane, such as in the sagittal plane as depicted in FIGS. 3 and 5 for example, is described by a first polynomial equation of at least degree 3, and the profile of the front portion 19 in the same plane is described by a second polynomial equation of at least degree 5, wherein the x and y parameters of the polynomial equations are defined from an x-axis and an y-axis perpendicular to each other and lying within the sagittal plane, wherein the origin of said x-axis and y-axis is the geometric center of the light source(s).

The lens 10 of FIGS. 2 to 5 is defined from the following first polynomial equation: $y=-0.61x^4-7.74x^3-36.47x^2-74.40x-49$, and the following second polynomial equation: $y=-3E-05x^6+0.0009x^5-0.0086x^4+0.0242x^3-0.0307x^2+0.5574x+8.2846$ (e.g. in millimeters). The origin of the x-axis and y-axis is the geometric center of the light source (if there is only one light source) or the geometric center of the light sources (if there is a plurality of light sources).

The surfaces of the rear portion and/or the front portion may be rotationally constructed from the profile defined by the polynomial equations, around an axis 15 defined as the intersection between said sagittal plane and the planar base surface 14. Nevertheless, a more complex construction may be provided.

The distal part of the front portion from the rear portion is a planar face 17 perpendicular to the planar base surface 14. Said planar face 17 corresponds to the asymptote of the second polynomial equation describing the profile of the front portion 19.

The lodging 13 receiving the light source, optionally a lambertian LED, is positioned in the sagittal plane of the lens, i.e. on the centerline of said lens 10, at ¼ of the distance between the rear end and the front end of said lens 10. In this way, the rear portion 18 is optimized in order to maximize total internal reflection and therefore sending to the front portion 19 light rays that would otherwise go rearward. The front portion 19 of the profile is optimized to transmit light as much as possible and therefore minimize light rays being bounced back to the rear part 18. It should be noted that, in this way, the lens 10 is arranged such that at least 50%, and preferably at least 75%, of the light emitted directly by the light source(s) is reflected on the curved rear portion 18 and at least 50%, and preferably at least 90%, of the light reflected on surfaces of the lens or directly emitted by the light source(s) is transmitted through the front portion 19. Moreover, it should be noted that the lens 10 is arranged such that output beams are parallel to each other at least in the sagittal plane. The light output from the optical device can therefore illuminate efficiently and remotely an area to be illuminated.

Furthermore, depending on the profile of the rear portion and respectively the front portion, the lodging 13 of the entry diopter 11 can be positioned along the center line 15 between the rear end of the lens 10 and the middle part of said lens 10.

FIG. 5 illustrates in 2D the path which is followed by light rays emitted by a punctual lambertian light source through an optical device as shown on FIGS. 2 to 4. Such a light source normally leads to a round light beam. A LED 20 may be approximated as a punctual light source.

Figure 6:
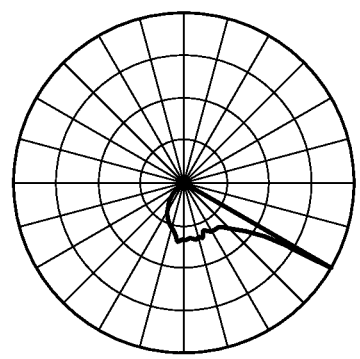
FIG. 6 shows a diagram of the flux out of the lens of the optical device according to the invention.

FIG. 6 shows the effect of the lens 10 according to FIGS. 2-5 on the conical light beam emitted by a lambertian LED 20. It appears that the rear portion 18 is optimized in order to maximize total internal reflection and therefore send to the front portion 19 light rays that would otherwise go rearward and the front portion 19 of the profile is optimized to transmit light as much as possible and therefore minimize light rays being bounced back to the rear part 18.

FIG. 6 shows the polar representation of the light beam at the exit diopter 12. This representation shows that the light beam is clearly asymmetrical.

However, it may be desired to provide an exit light beam that is symmetrical.

Figure 7:
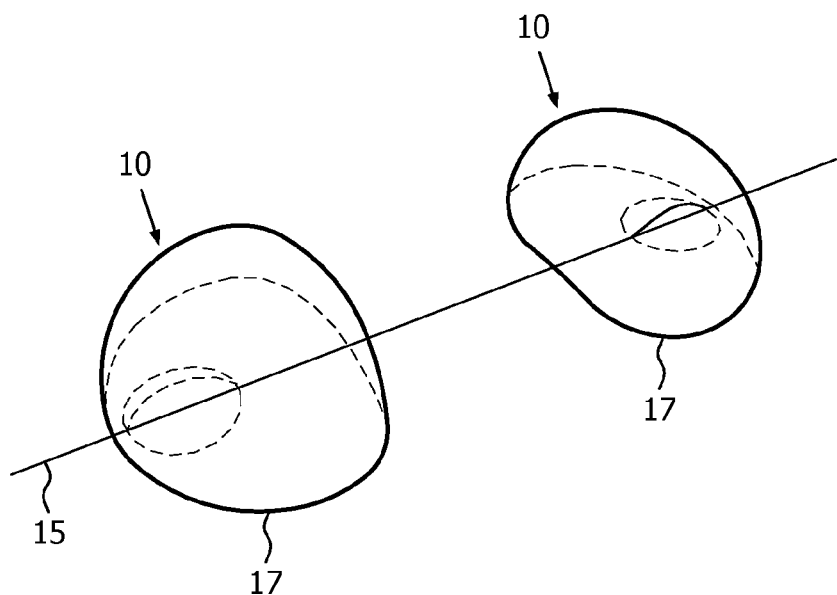
FIG. 7 shows a schematic perspective view from above of a second embodiment of an optical device according to the invention to generate a symmetrical light beam.

FIG. 7 represents another embodiment of an optical device according to the invention. In this embodiment, two lenses 10 are facing together, the planar face 17 of a first lens 10 facing the planar face 17 of the second lens 10. The sagittal plane A of the lenses 10 are merging and said lenses 10 are positioned at a given distance d. Such construction allows the generation of a symmetrical light beam in such manner that said lens 10 can be used in the conception of luminaries generating a symmetrical light beam either an asymmetrical light beam.

It should be noted that LEDs are a good alternative to standard light sources used for street lighting. A large number of LEDs may be mounted on each luminary head to provide sufficient lighting. In order to provide an attractive product, the dimensions of the luminary head should remain reasonably low.

One of the advantages of LEDs is miniaturization. In outdoor appliances, this allows for reduced thickness of the luminary head with miniaturized optics. The invention proposes optics for LEDs, easy to design and to adapt to a large range of configurations.

Usually, lenses 10 according to the invention are manufactured by compression moulding or injection moulding, according to well known techniques. Preferably, they are made with a transparent material. This material may be colored or colorless, depending on the desired application. For instance, an appropriate material is polymethacrylate, more specifically poly(methylmethacrylate). Other transparent plastics may be used such as polycarbonates.

Optical devices according to an embodiment of the invention can be used for street luminary for instance. Such street luminary comprises a luminary head which is provided at the top of a luminary post. The luminary head comprises a support for a plurality of lighting devices arranged below the support of the luminary head and directed towards the ground.

Each lighting device comprises at least one light emitting diode (LED) upstream, with respect to light propagation, of at least one optical device, such as such as the embodiment of FIGS. 2 to 5, said optical devices having substantially the same bearing, to generate an asymmetrical light beam.

To provide a street luminary generating a symmetrical light beam, the luminary head can comprise a plurality of light emitting diodes (LED), at least one LED being arranged upstream of each optical device as described in FIGS. 2 to 5, said optical devices being arranged in pair(s) wherein two lenses (10) of each pair are facing together, the front portion of a first lens (10) facing the front portion of the second lens (10) to generate a symmetrical light beam as shown in FIG. 7.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An optical device for imparting an asymmetrical light beam, said optical device comprising a lens having:
   an exit diopter which comprises an exit surface consisting of a convex surface defining a curved rear portion having a first curvature and a curved front portion having a second curvature different from the first curvature;
   an entry diopter including at least one concave lodging for lodging at least one light source, the surface of the concave lodging facing at least partly the curved rear portion;
   wherein the lens is arranged such that at least 50% of the light emitted directly by the light source(s) is reflected without reflectors or reflective coatings by total internal reflection on the curved rear portion and at least 50% of the light reflected on surfaces of the lens and directly emitted by the light source(s) is transmitted through the front portion.

2. The optical device of claim 1, wherein a planar base surface joins the concave lodging to the rear portion and front portion of the exit diopter.

3. The optical device of claim 1, wherein the curved rear portion has a profile that provide an internal reflection of at least 75% of light rays coming directly from the light source and a front part that transmit at least 90% of light rays coming directly from the light source and reflected light rays.

4. The optical device of claim 1, wherein the lodging is positioned at ¼ of the distance between the rear portion and the front portion of said lens.

5. The optical device of claim 1, wherein each concave lodging has an axis of symmetry.

6. The optical device of claim 5, wherein each concave lodging is a portion of a sphere.

7. The optical device of claim 5, wherein each concave lodging is a portion of a sphere cut off by a plane at a distance comprised between 0.1*r and 0.8*r from the center of the sphere, wherein r is the radius of the sphere.

8. The optical device of claim 1, wherein a profile of the rear portion in a plane is described by a first polynomial equation of at least degree 3, and a profile of the front portion in the same plane is described by a second polynomial equation of at least degree 5, wherein the x and y parameters of the polynomial equations are defined from an x-axis and an y-axis perpendicular to each other and lying within the plane.

9. The optical device according to claim 8, wherein said plane is a sagittal plane of the lens.

10. The optical device according to claim 2, wherein the surfaces of the rear portion and/or the front portion are rotationally constructed around an axis defined as the intersection between said plane and the planar base surface, in a Cartesian orthonormal coordinate system wherein x-axis and y-axis lie within the sagittal plane of the lens.

11. The optical device according to claim 1, wherein the distal part of the front portion from the rear portion is a planar face perpendicular to the base plane surface.

12. The optical device according to claim 9, wherein the lens is arranged such that output beams are parallel to each other in the sagittal plane.

13. The optical device of claim 8, wherein the first polynomial equation is: $y=-0.61x4-7.74x3-36.47x2-74.40x-49$, and the second polynomial equation is: $y=-3E-05x6+0.0009x5\times0.0086x4+0.0242x3-0.0307x2+0.5574x+8.2846$, wherein the origin of x-axis and y-axis is the geometric center of the light source(s).

14. An optical device for imparting an asymmetrical light beam, comprising
a lens:
an exit diopter of the lens having a convex exit surface defining a curved rear portion with a first curvature and a curved front portion having a second curvature different from the first curvature;
an entry diopter including at least one concave lodging for lodging at least one light source, the surface of the concave lodging facing at least partly the curved rear portion;
wherein the lens is arranged for total internal reflection such that at least 75% of the light emitted directly by the light source is reflected on the curved rear portion without reflectors or reflective coatings and at least 90% of the light reflected on surfaces of the lens and directly emitted by the light source is transmitted through the front portion; and
wherein each of the at least one concave lodging is a portion of a sphere cut off by a plane at a distance comprised between 0.1*r and 0.8*r from the center of the sphere, wherein r is the radius of the sphere.

15. An optical device for imparting an asymmetrical light beam, comprising
a lens:
an exit diopter of the lens having a convex exit surface defining a curved rear portion with a first curvature and a curved front portion having a second curvature different from the first curvature;
an entry diopter including at least one concave lodging for lodging at least one light source, the surface of the concave lodging facing at least partly the curved rear portion;
wherein the lens is arranged for total internal reflection such that at least 75% of the light emitted directly by the light source is reflected on the curved rear portion without reflectors and at least 90% of the light reflected on surfaces of the lens and directly emitted by the light source is transmitted through the front portion;
the concave lodging positioned on a sagittal plane of the optical device and is further positioned about one quarter of the distance between a rear end and a front end of the optical device;
the lens arranged such that the light emitted through the front portion is a plurality of light output beams substantially parallel to each other.

* * * * *